US012646807B2

(12) United States Patent
Park et al.

(10) Patent No.: US 12,646,807 B2
(45) Date of Patent: Jun. 2, 2026

(54) BATTERY MODULE WITH ICB ASSEMBLY IN SPACE-SAVING STRUCTURE

(71) Applicant: LG Chem, Ltd., Seoul (KR)

(72) Inventors: Jin-Yong Park, Daejeon (KR); Kyung-Mo Kim, Daejeon (KR); Seung-Joon Kim, Daejeon (KR); Jeong-O Mun, Daejeon (KR); Ho-June Chi, Daejeon (KR); Hee-Jun Jin, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 996 days.

(21) Appl. No.: 17/267,257

(22) PCT Filed: Sep. 23, 2019

(86) PCT No.: PCT/KR2019/012346
§ 371 (c)(1),
(2) Date: Feb. 9, 2021

(87) PCT Pub. No.: WO2020/075988
PCT Pub. Date: Apr. 16, 2020

(65) Prior Publication Data
US 2021/0313657 A1 Oct. 7, 2021

(30) Foreign Application Priority Data
Oct. 10, 2018 (KR) ........................ 10-2018-0120759

(51) Int. Cl.
*H01M 50/519* (2021.01)
*H01M 10/48* (2006.01)
(Continued)

(52) U.S. Cl.
CPC ......... *H01M 50/519* (2021.01); *H01M 10/48* (2013.01); *H01M 10/482* (2013.01);
(Continued)

(58) Field of Classification Search
None
See application file for complete search history.

(56) References Cited

U.S. PATENT DOCUMENTS

| | | | | |
|---|---|---|---|---|
| 5,195,213 A | * | 3/1993 | Ohgami | ................ G06F 1/1681 361/825 |
| 2011/0059342 A1 | | 3/2011 | Lee et al. | |

(Continued)

FOREIGN PATENT DOCUMENTS

| | | |
|---|---|---|
| CN | 102315401 A | 1/2012 |
| CN | 105264687 A | 1/2016 |

(Continued)

OTHER PUBLICATIONS

English translation of Kwang et al. (KR-20180099438-A). (Year: 2018).*

(Continued)

*Primary Examiner* — Jonathan G Leong
*Assistant Examiner* — Drew C Newman
(74) *Attorney, Agent, or Firm* — Lerner David LLP

(57) ABSTRACT

A battery module includes a cell stack having a plurality of battery cells stacked in one direction, and an ICB assembly electrically connected to the plurality of battery cells to sense voltage information. The ICB assembly includes front and rear bus bar frames, a sensing member, and at least one bridge plate. The front and rear bus bar frames are assembled to respective front and rear sides of the cell stack, the front and rear bus bar frames each having a respective plurality of bus bars that are in contact with electrode leads of the battery cells. The sensing member has one side fixed to the front bus bar frame and the other side fixed to the rear bus bar frame; and the at least one bridge plate is connected to the front and rear bus bar frames to maintain a gap of a constant distance therebetween.

20 Claims, 6 Drawing Sheets

(51) Int. Cl.

| | |
|---|---|
| *H01M 50/209* | (2021.01) |
| *H01M 50/211* | (2021.01) |
| *H01M 50/271* | (2021.01) |
| *H01M 50/284* | (2021.01) |
| *H01M 50/50* | (2021.01) |
| *H01M 50/503* | (2021.01) |
| *H01M 50/507* | (2021.01) |
| *H01M 50/569* | (2021.01) |

(52) U.S. Cl.
CPC ....... *H01M 10/486* (2013.01); *H01M 50/209* (2021.01); *H01M 50/211* (2021.01); *H01M 50/271* (2021.01); *H01M 50/284* (2021.01); *H01M 50/50* (2021.01); *H01M 50/503* (2021.01); *H01M 50/507* (2021.01); *H01M 50/569* (2021.01)

(56) References Cited

U.S. PATENT DOCUMENTS

| | | | |
|---|---|---|---|
| 2012/0003526 A1 | 1/2012 | Kume et al. | |
| 2012/0019061 A1* | 1/2012 | Nishihara | H01M 10/482 |
| | | | 429/7 |
| 2012/0161677 A1 | 6/2012 | Kunimitsu et al. | |
| 2015/0144409 A1 | 5/2015 | Fujii | |
| 2016/0133890 A1 | 5/2016 | Lee et al. | |
| 2017/0141365 A1 | 5/2017 | Kim et al. | |
| 2018/0194235 A1 | 7/2018 | Kim et al. | |
| 2019/0001838 A1 | 1/2019 | Choi et al. | |
| 2019/0020012 A1 | 1/2019 | Ju et al. | |
| 2019/0348720 A1 | 11/2019 | Oh et al. | |
| 2019/0389318 A1 | 12/2019 | Lee et al. | |
| 2020/0014005 A1 | 1/2020 | Lee et al. | |

FOREIGN PATENT DOCUMENTS

| | | | | |
|---|---|---|---|---|
| CN | 207518008 | U | * | 6/2018 |
| CN | 210607431 | U | | 5/2020 |
| JP | 2012523083 | A | | 9/2012 |
| JP | WO2014034079 | A1 | | 8/2016 |
| JP | 6234929 | B2 | | 11/2017 |
| KR | 20050032659 | A | | 4/2005 |
| KR | 20150015169 | A | | 2/2015 |
| KR | 20170056976 | A | | 5/2017 |
| KR | 101829350 | B1 | | 2/2018 |
| KR | 101844852 | B1 | | 4/2018 |
| KR | 101842515 | B1 | * | 5/2018 |
| KR | 20180078777 | A | | 7/2018 |
| KR | 20180099438 | A | | 9/2018 |
| KR | 20180099440 | A | | 9/2018 |
| WO | 2018038513 | A1 | | 3/2018 |
| WO | 2018066797 | A1 | | 4/2018 |
| WO | 2018124494 | A2 | | 7/2018 |
| WO | 2018124751 | A1 | | 7/2018 |

OTHER PUBLICATIONS

English translation of Lee et al. (KR-101844852-B1). (Year: 2018).*
English translation of Kim et al. (KR-101842515-B1). (Year: 2018).*
English translation of Xiao et al. (CN-207518008-U). (Year: 2018).*
Search Report for European Application No. 19870527.9 mailed Dec. 8, 2021. 2 pgs.
International Search Report for Application No. PCT/KR2019/012346, mailed Dec. 27, 2019, pp. 1-2.

* cited by examiner

Prior Art

BATTERY MODULE WITH ICB ASSEMBLY IN SPACE-SAVING STRUCTURE

CROSS-REFERENCE TO RELATED APPLICATIONS

The present application is a national phase entry under 35 U.S.C. § 371 of International Application No. PCT/KR2019/012346 filed Sep. 23, 2019, which claims priority from Korean Patent Application No. 10-2018-0120759 filed on Oct. 10, 2018, the disclosures of which are incorporated herein by reference.

TECHNICAL FIELD

The present disclosure relates to a battery module, and more particularly, to a battery module to which an ICB assembly advantageous for improving an energy density is applied.

BACKGROUND ART

Recently, the secondary battery has been attracting attention as a power source for an electric vehicle (EV) and a hybrid electric vehicle (HEV), which are proposed as a solution for air pollution caused by existing gasoline and diesel vehicles using fossil fuels.

In smaller mobile devices, one or a few battery cells are used per device. However, middle-sized or large-sized devices such as a vehicle use a middle-sized or large-sized battery module in which a plurality of battery cells are electrically connected due to the need for high power large capacity, or a battery pack implemented by connecting a plurality of such battery modules.

Since the middle-sized or large-sized battery module is preferably manufactured to have as small size and weight as possible, the battery cells may be stacked with a high degree of integration. Also, rectangular cells and pouch-type cells having a small weight per capacity are frequently used as battery cells applied to the middle-sized or large-sized battery module.

The medium-sized or large-sized battery modules also use an electrical component called an ICB (Inter Connection Board) to electrically connect the battery cells. For example, if the battery module uses a pouch-type secondary battery, the ICB may include a plurality of bus bars and be assembled at locations where electrode leads of the battery cells are provided. The battery cells may be electrically connected in series, in parallel, or in a combination of series and parallel, as the electrode leads are attached to the bus bars of the ICB by welding or the like.

In addition, the medium-sized or large-sized battery module may further include a sensing unit for detecting voltage and temperature and transmitting the voltage and temperature to a BMS in order to prepare for the case where some battery cells have overvoltage, overcurrent or overheating. Recently, a design plan for integrating the sensing unit with the ICB has been proposed to reduce the number of components and the volume.

For example, as shown in FIG. 1, a conventional ICB assembly includes a front bus bar frame 20 and a rear bus bar frame 30 respectively assembled at a front side and a rear side of a cell stack 10, and a top frame 40 covering an upper portion of the cell stack 10. In addition, a FPC (Flexible Printed Circuit) serving as a sensing unit 50 for sensing voltage information of battery cells is attached to an upper surface or a lower surface of the top frame 40.

The battery module may be configured by packaging the ICB assembly and the cell stack with a module case. Recently, the module case frequently adopts a mono frame having a square tube shape in a hollow structure to improve the energy density. However, the conventional battery module as described above has the following problems.

The top frame 40 of the conventional ICB assembly has the advantage of protecting the upper portion of the cell stack 10 and the FPC 50, but decreases the width of the cell stack 10 stored in the mono frame as much as the thickness thereof, thereby reducing the energy density of the battery module.

In addition, the top frame 40 makes it difficult to meet the assembly dimensional tolerances in the assembly process for accommodating the cell stack 10 in the mono frame. In other words, the mono frame-type battery module integrally accommodates the cell stack 10 and the ICB assembly very tightly in the mono frame to maximize the energy density. However, since the top frame 40 is added to the upper portion of the cell stack 10, it is more difficult to meet the assembly dimensional tolerances that allow the cell stack 10 to be assembled suitable for the width of the mono frame, thereby deteriorating the yield during the assembling process. Accordingly, there is a demand for developing a battery module to which an ICB assembly having a new structure is applied.

DISCLOSURE

Technical Problem

The present disclosure is designed to solve the problems of the related art, and therefore the present disclosure is directed to providing a battery module to which an ICB assembly capable of supporting a cell stack with a minimized number of components and capable of increasing the energy density of the cell stack is applied.

In addition, the present disclosure is directed to providing a battery module, which may allow the ICB assembly to be assembled with the cell stack and the module case excellently.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, which includes a cell stack having a plurality of battery cells stacked in one direction, and an ICB assembly electrically connected to the plurality of battery cells to sense voltage information, wherein the ICB assembly includes a front bus bar frame assembled to a front side of the cell stack and a rear bus bar frame assembled to a rear side of the cell stack, the front bus bar frame and the rear bus bar frame respectively having a plurality of bus bars that are in contact with electrode leads of the battery cells; a sensing member assembled such that one side thereof is fixed to the front bus bar frame and the other side thereof is fixed to the rear bus bar frame; and at least one bridge plate connected to the front bus bar frame and the rear bus bar frame to keep a gap between the front bus bar frame and the rear bus bar frame constant.

The at least one bridge plate may include two bridge plates, and the two bridge plates may be disposed at both side surfaces of the front bus bar frame and the rear bus bar frame one by one.

At least one of the front bus bar frame and the rear bus bar frame may have a bridge assembling portion formed at a top end of both side surfaces thereof so that an end portion of the bridge plates is hinged thereto.

The bridge assembling portion may have a hinge shaft formed to protrude from a surface thereof, and the end portion of the bridge plates may have a perforated hole into which the hinge shaft is inserted.

The hinge shaft may be deformed so that a portion thereof exposed through the perforated hole to an opposite surface of the bridge plate has a greater diameter than the perforated hole.

The bridge assembling portion may further have a stopper configured to restrict the front bus bar frame and the rear bus bar frame from rotating about the hinge shaft beyond a predetermined angle with respect to the bridge plate.

The stopper may include a first stopper surface provided at a location spaced apart from a periphery of the hinge shaft to contact a lower surface of the end portion of the bridge plate when the angle between the front bus bar frame or the rear bus bar frame and the bridge plate becomes 90 degrees.

The stopper may further include a second stopper surface provided orthogonal to the first stopper surface to contact an upper surface of the end portion of the bridge plate when the angle between the front bus bar frame or the rear bus bar frame and the bridge plate becomes 180 degrees.

The front bus bar frame and the rear bus bar frame may have slits through which the electrode leads pass forward and rearward, and the slits may be opened to a lower end of the front bus bar frame or the rear bus bar frame.

The sensing member may be any one of a FPC (Flexible Printed Circuit) and a FFC (Flexible Flat Cable).

The FPC or the FFC may be disposed to pass through a slot perforated in the front bus bar frame and the rear bus bar frame at a location adjacent to and below a top surface thereof.

The battery module may further comprise a module case having a rectangular tube shape and configured to integrally accommodate the cell stack and the ICB assembly; and a module cover configured to shield a front side and a rear side of the module case, which are opened.

In another aspect of the present disclosure, there is also provided a battery pack, comprising the battery module described above.

Advantageous Effects

According to an embodiment of the present disclosure, it is possible to provide a battery module to which an ICB assembly capable of supporting a cell stack with a minimized number of components and capable of increasing the energy density of the cell stack is applied.

In addition, the present disclosure is directed to providing a battery module, which may allow the ICB assembly to be assembled with the cell stack and the module case conveniently.

BEST MODE

Figure 1:
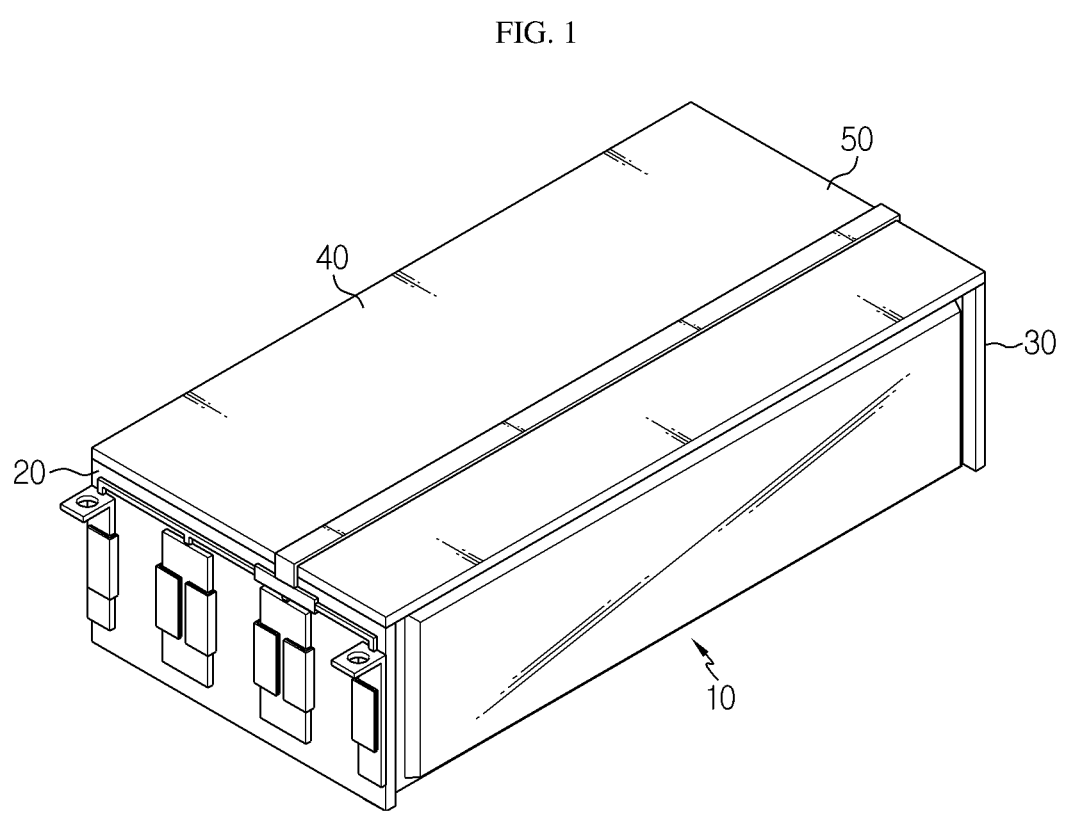
FIG. 1 is a schematic perspective view showing a cell stack and a bus bar frame assembly of a conventional battery module in an assembled state.

Since embodiments of the present disclosure are provided to more fully explain the present disclosure to those skilled in the art, the shape and size of components in the drawings may be exaggerated, omitted or schematically illustrated for clarity. Thus, the size or ratio of components does not necessarily reflect the actual size or ratio.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustration only, not intended to limit the scope of the disclosure, so it should be understood that other equivalents and modifications could be made thereto without departing from the scope of the disclosure.

Figure 2:
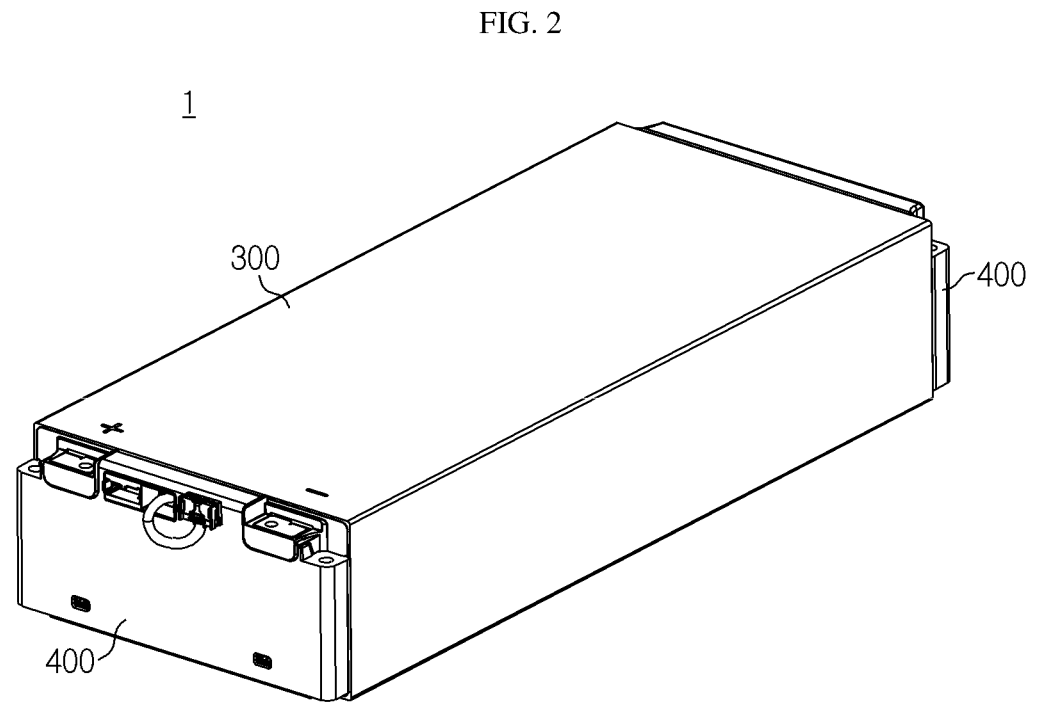
FIG. 2 is a schematic perspective view showing a battery module according to an embodiment of the present disclosure.
Figure 3:
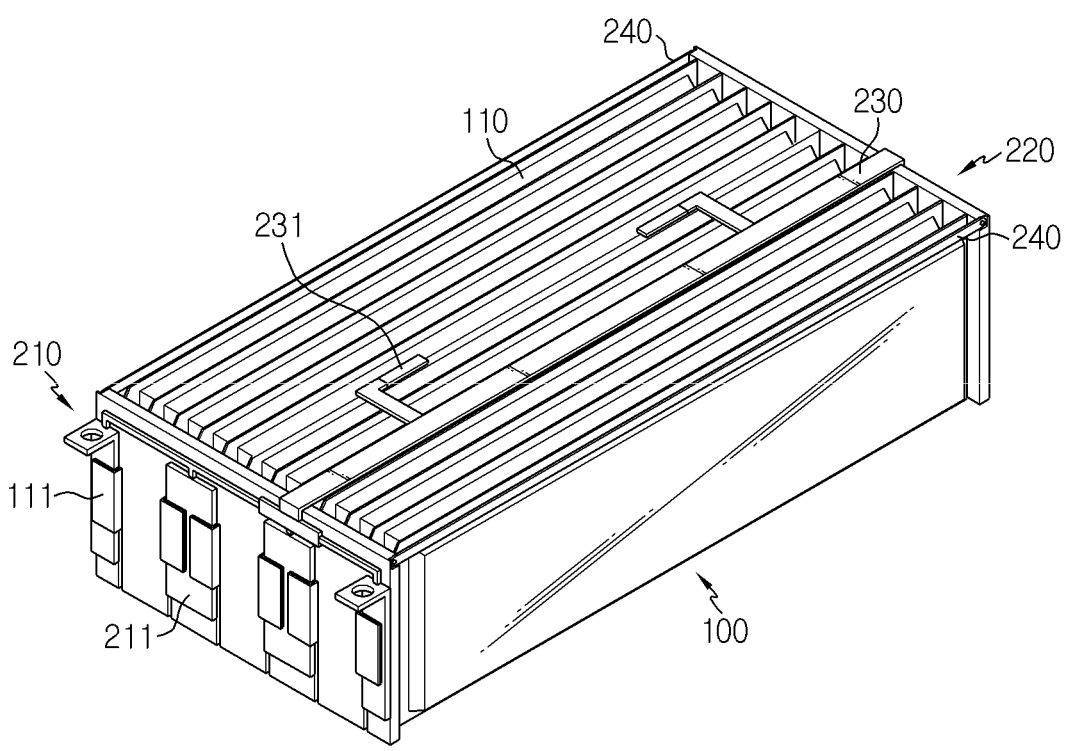
FIG. 3 is a schematic perspective view showing a cell stack and an ICB assembly accommodated in a module case of FIG. 2.

FIG. 2 is a schematic perspective view showing a battery module according to an embodiment of the present disclosure, and FIG. 3 is a schematic perspective view showing a cell stack and an ICB assembly accommodated in a module case of FIG. 2.

Referring to FIGS. 2 and 3, a battery module 1 according to an embodiment of the present disclosure includes a cell stack 100, an ICB assembly 200, a module case 300, and a module cover 400.

First, the cell stack 100 will be described. The cell stack 100 may be a collection of a plurality of battery cells 110. Here, the battery cell 110 is a pouch-type secondary battery, and though not shown in detail, the battery cell 110 is a bi-directional pouch-type secondary battery in which a positive electrode lead and a negative electrode lead protrude in opposite directions.

The pouch-type secondary battery may include an electrode assembly, an electrolyte and a pouch exterior. The pouch exterior may include two pouches, and a concave inner space may be formed in at least one of the two pouches. In addition, the electrode assembly may be accommodated in the inner space of the pouch. Sealing portions are provided at outer circumferences of the two pouches, and the sealing portions are welded to each other so that the inner space accommodating the electrode assembly may be sealed. A portion of the electrode lead 111 may be fused to the sealing portion of the pouch exterior and the other portion of the electrode lead 111 may extend out of the pouch exterior and be exposed out of the pouch exterior to function as an electrode terminal of the secondary battery.

The pouch-type secondary battery cells are erected in a vertical direction and stacked in a horizontal direction to form the cell stack 100. Hereinafter, the positions of the secondary battery cell at which the electrode leads 111 are located will be are defined as a front portion and a rear portion of the cell stack 100.

The ICB assembly 200 is a component for electrically connecting the plurality of battery cells 110 forming the cell stack 100 and sensing voltage information of the battery cells 110. The ICB assembly 200 may include a front bus bar frame 210, a rear bus bar frame 220, a sensing member 230 and a bridge plate 240.

As shown in FIG. 3, the front bus bar frame 210 and the rear bus bar frame 220 may be respectively disposed at a front portion and a rear portion of the cell stack 100 and have a plate-like shape for supporting the front portion and the rear portion of the cell stack 100. The front bus bar frame 210 and the rear bus bar frame 220 may include a plurality of bus bars disposed at a front surface thereof and slits 212 therethrough formed at a left side and/or a right side thereof based on the bus bars so that the electrode leads 111 pass therethrough.

The slits 212 of this embodiment are provided to be open to an end of the front bus bar frame 210 or the rear bus bar frame 220. In this case, the electrode leads 111 of the battery cells 110 may be assembled to be inserted upwards into the front bus bar frame 210 and the rear bus bar frame 220, which may improve the assembling efficiency.

In particular, as will be explained later, in this embodiment, the front bus bar frame 210 and the rear bus bar frame 220 are connected to the bridge plate 240, and thus the ICB assembly 200 having a uniform gap therebetween should be integrally assembled to the cell stack 100. In this case, the slit structures opened to the end of the frame may be more useful.

The battery cells 110 may be electrically connected by means of the bus bars 211 by welding the electrode leads 111 drawn out through the slits 212 to the bus bars 211.

For example, in this embodiment, twelve battery cells 110 in total are connected two by two in parallel by means of four bus bars disposed at the front bus bar frame 210 and three bus bars disposed at the rear bus bar frame 220, and the six bundles of battery cells 110 connected in parallel two by two are connected in series.

In the battery cells 110 of each bundle, the electrode leads 111 having the same polarity may be integrally attached to the bus bars 211 provided at the front bus bar frame 210 or the rear bus bar frame 220.

As shown in FIG. 3, positive electrode leads of a bundle of battery cells 110 are superimposed and welded to a bus bar 211 at a leftmost side among four bus bars 211 of the front bus bar frame 210, and negative electrode leads of another bundle of battery cells 110 are superimposed and welded to a bus bar 211 at a rightmost side. In addition, the positive electrode leads of any one bundle of battery cells 110 and the negative electrode leads of another bundle of battery cells 110 adjacent to each other were welded together to each of the remaining bus bars 211 of the front bus bar frame 210 and the rear bus bar frame 220. In this way, twelve battery cells 110 in total may be connected in series two by two. Namely, six bundles of battery cells 110 may be connected in series.

Meanwhile, the battery module 1 according to this embodiment includes twelve battery cells 110 connected in series and in parallel in total, but the scope of the present disclosure should not be limited thereto. That is, the number of battery cells 110 configuring the cell stack 100 may naturally be more or less than 12. In addition, the number of bus bars 211 may be increased or decreased, and their positions may also be changed depending on the number of the battery cells 110.

The sensing member 230 senses voltage or temperature of each battery cell 110 and transmits the voltage or temperature to a BMS to control the charge and discharge of a battery cell 110 having a problem in order to prepare for overvoltage, overcurrent or overheating of the battery cells 110.

Since battery cells 110 are connected in series by means of the bus bars 211, the voltage of each battery cell 110 may be known by connecting a sensing terminal to each bus bar and sensing the voltage thereof. The sensed voltage values of the battery cells 110 may be transmitted to a BMS (not shown), and the BMS may control the charge and discharge state of the abnormal battery cells 110 based on the voltage values.

The sensing member 230 may be any one of FPC (Flexible Printed Circuit), FFC (Flexible Flat Cable) and a harness cable. Among them, the FPC or the FFC having simple wiring and small volume, which is advantageous in increasing the degree of space freedom, may be preferred. In addition, a thermistor 231 for measuring the temperature of the battery cells 110 may be further added to the sensing member 230.

In this embodiment, the FPC 230 employed as the sensing member 230 may be disposed to extend along the longitudinal direction of the cell stack 100 from an upper portion of the cell stack 100. Also, one side of the FPC 230 is fixed to the top end of the front bus bar frame 210 and the other side thereof is fixed to the top end of the rear bus bar frame 220, thereby securing the fixation.

The bridge plate 240 plays a role of keeping a gap between the front bus bar frame 210 and the rear bus bar frame 220 constant and supporting the front bus bar frame 210 and the rear bus bar frame 220 to rotate at a predetermined angle. The bridge plate 240 is manufactured in the form of a long elongated plate made of reinforced plastic or metal such as steel with excellent mechanical rigidity and replaces the top frame of the conventional ICB assembly.

Figure 4:
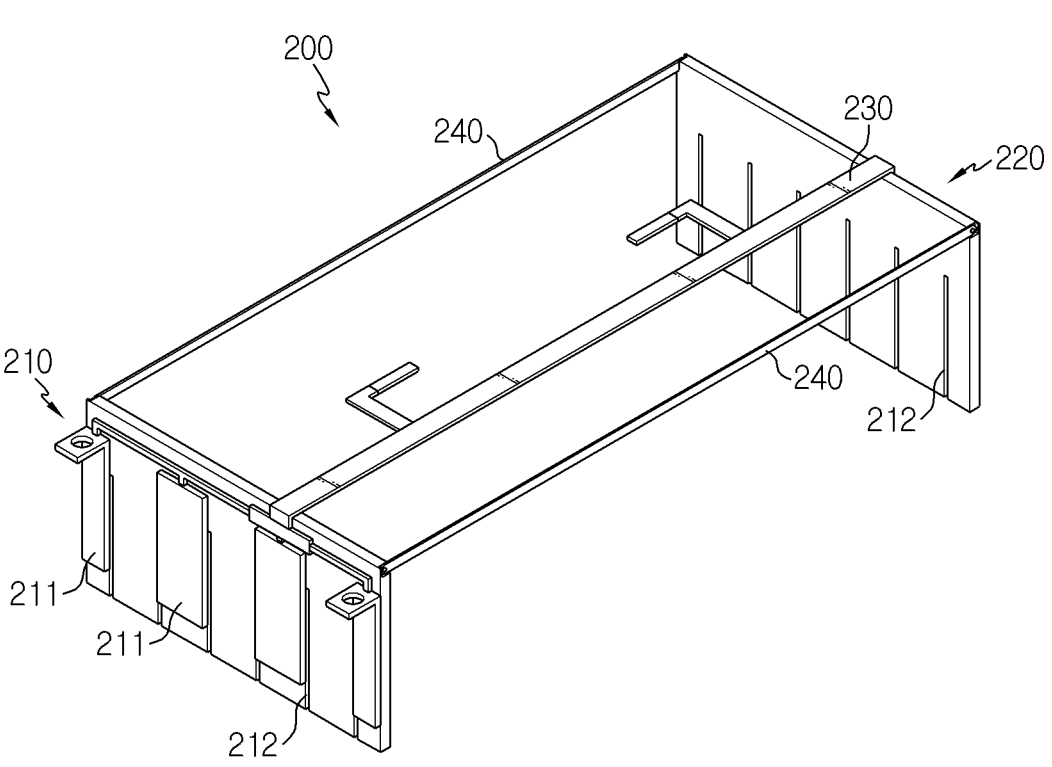
FIGS. 4 and 5 are schematic perspective views showing the ICB assembly according to an embodiment of the present disclosure in an assembled state and in a partially exploded state.
Figure 5:
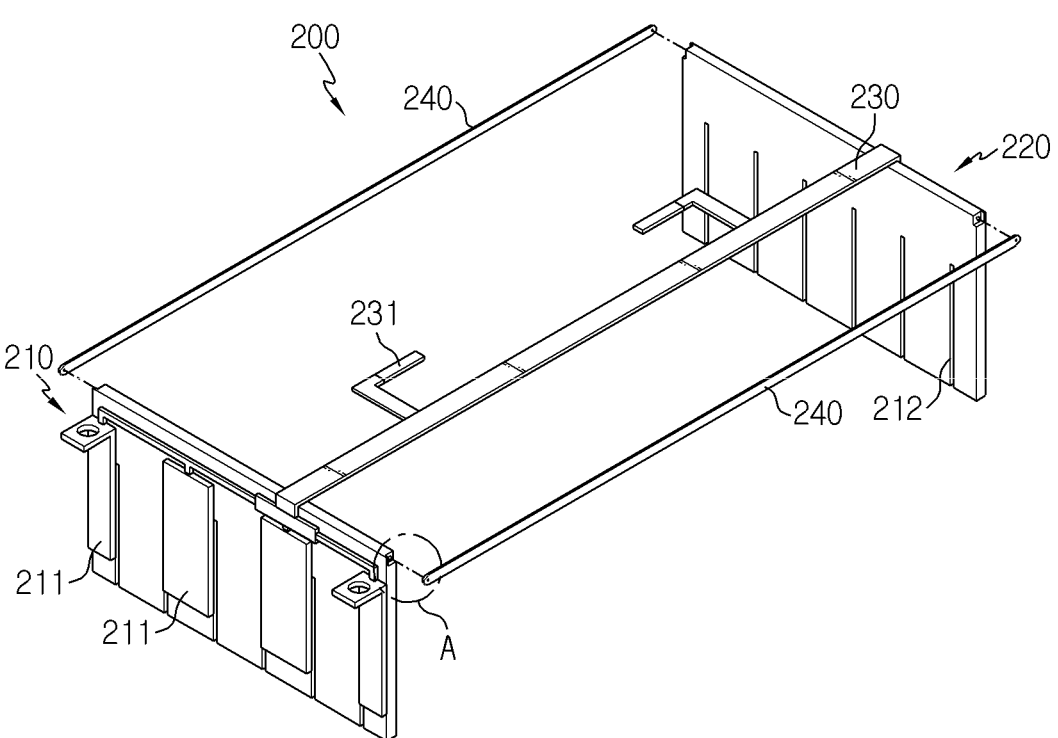

Referring to FIGS. 4 and 5, the ICB assembly 200 according to this embodiment will be described in detail. Two bridge plates 240 are connected to both side surfaces of the top end of the front bus bar frame 210 and the rear bus bar frame 220 one by one so that a gap therebetween is kept constant. In particular, two bridge plates 240 are coupled to both side surfaces of the front bus bar frame 210 and the rear bus bar frame 220 below the top surface thereof so that the ICB assembly 200 of this embodiment has a smaller width compared to the conventional ICB assembly having the top frame 40 (see FIG. 1).

That is, the ICB assembly 200 of this embodiment has a height reduced by the thickness of at least the top frame 40 compared to the conventional ICB assembly having the top frame 40. Thus, the width of the battery cells 110 may be increased as much as the space occupied by the top frame 40, so that the cell stack 100 and the ICB assembly 200 are stored in the module case 300 more efficiently, thereby increasing the energy density.

In addition, the gap between the front bus bar frame 210 and the rear bus bar frame 220 may be kept constant by the bridge plate 240 even when vibration or shock is applied, thereby preventing the FPC 230 from being torn or disconnected.

Next, the hinge coupling structure among the front bus bar frame 210, the rear bus bar frame 220 and the bridge plate 240 constituting the ICB assembly 200 will be described in detail.

Since the hinge coupling structure between the front bus bar frame 210 and the bridge plate 240 is the same as the hinge coupling structure between the rear bus bar frame 220 and the bridge plate 240, the hinge coupling structure between the front bus bar frame 210 and the bridge plate 240 will be described in detail, and the hinge coupling structure between the rear bus bar frame 220 and the bridge plate 240 will not be described in detail.

Figure 6:
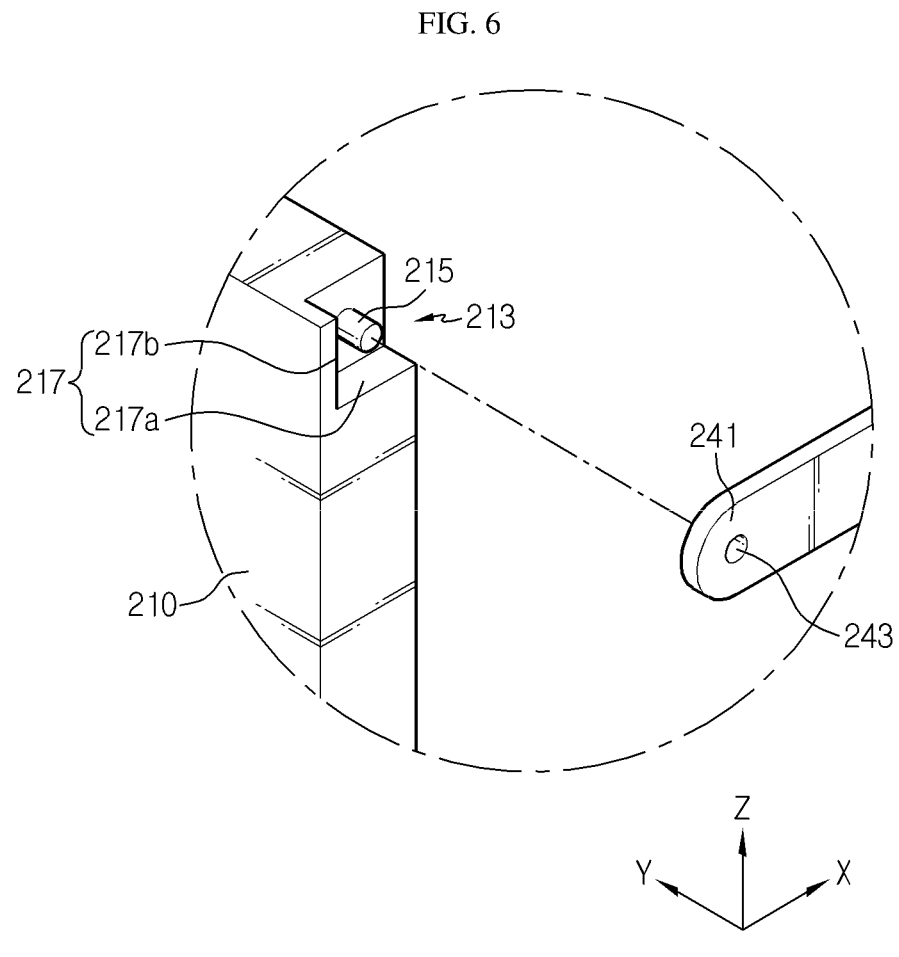
FIG. 6 is an enlarged view showing a portion A of FIG. 5.

As shown in FIGS. 5 and 6, the front bus bar frame 210 and the rear bus bar frame 220 respectively include bridge assembling portions 213 for connecting both end portions 241 of the bridge plate 240 to the top ends of both side surfaces thereof.

The bridge assembling portion 213 has a hinge shaft 215 formed to protrude from the surface thereof (in the −Y-axis direction), and the end portion 241 of the bridge plate 240 coupled thereto has a perforated hole 243 having a diameter into which the hinge shaft 215 may be inserted.

Figure 7:
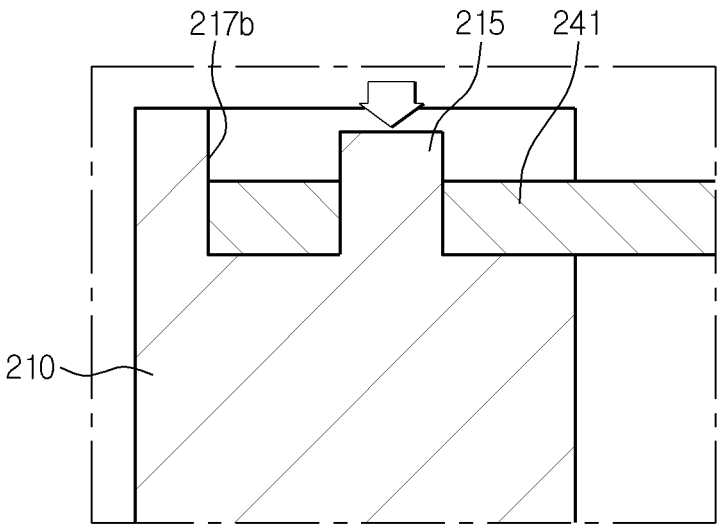
FIGS. 7 and 8 are diagrams for illustrating a process of assembling a bridge assembling portion and a bridge plate according to an embodiment of the present disclosure.
Figure 8:
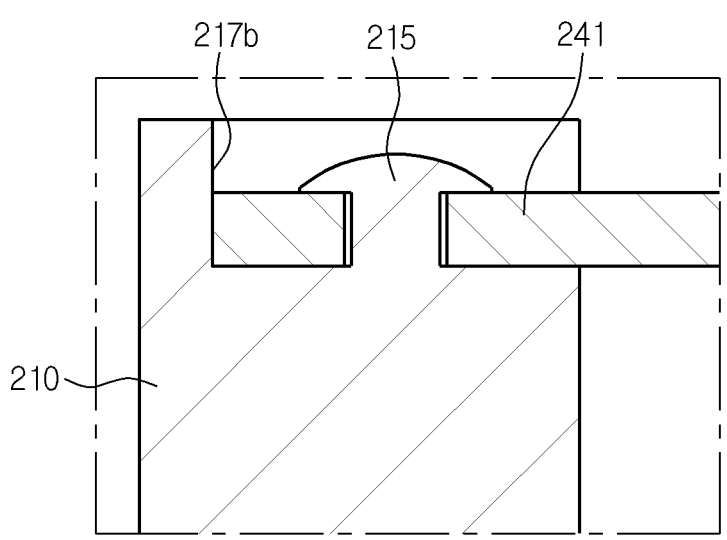

The hinge shaft 215 is fit into the perforated hole 243 as shown in FIG. 7, and then a head portion of the hinge shaft 215 may be deformed to have a greater diameter than the perforated hole 243 as shown in FIG. 8 so that the end portion 241 of the bridge plate 240 is not separated from the bridge assembling portion 213.

Here, the hinge shaft 215 may be deformed by forging, hot-melt or spinning. As an alternative to this embodiment, a hole may be formed in the surface of the bridge assembling portion 213, and the end portion 241 of the bridge plate 240 may be coupled to the bridge assembling portion 213 using a rivet or a shoulder bolt.

Since the front bus bar frame 210 or the rear bus bar frame 220 is hinged to the bridge plate 240 as described above, the ICB assembly 200 may be easily assembled to the cell stack 100.

In other words, in order to assemble the ICB assembly 200 to the cell stack 100, the electrode leads 111 of the battery cells 110 should be inserted into the slits 212 of the front bus bar frame 210 and the slits 212 of the rear bus bar frame 220, respectively, and then the portions exposed out of the slits 212 should be welded to the surface of the bus bars.

At this time, in this embodiment, since the front bus bar frame 210 and the rear bus bar frame 220 are configured to be rotatable relative to the bridge plate 240, the front bus bar frame 210 or the rear bus bar frame 220 may be rotated outward to secure the assembling space, and then the electrode leads 111 may be inserted into the slits 212. For reference, in this embodiment, since the front bus bar frame 210 and the rear bus bar frame 220 are rotatable and also the slits 212 are opened to the bottom end of each bus bar frame, it is more convenient to insert the electrode leads 111 into the slits 212.

The bridge assembling portion 213 may further include a stopper 217 having a first stopper surface 217a and a second stopper surface 217b.

The stopper 217 plays a role of restricting the front bus bar frame 210 or the rear bus bar frame 220 to be rotatable within an angle range of 90 degrees to 180 degrees with respect to the bridge plate 240. Accordingly, it is possible to prevent the front bus bar frame 210 or the rear bus bar frame 220 from being erroneously assembled due to excessive rotation or prevent the electrode leads 111 of the battery cells 110 from being damaged.

Referring to FIG. 6 again, the top end of the side surface of the front bus bar frame 210 has a stepped surface of a rectangular area where a portion is recessed (in the +Y-axis direction) with respect to the other portion. The hinge shaft 215 is positioned at the center of the recessed stepped surface, and the first stopper surface 217a and the second stopper surface 217b are provided at locations spaced apart from the periphery of the hinge shaft 215. The first stopper surface 217a and the second stopper surface 217b may be implemented as walls that are orthogonal to each other and surround two peripheral surfaces of the hinge shaft 215.

Figure 9:
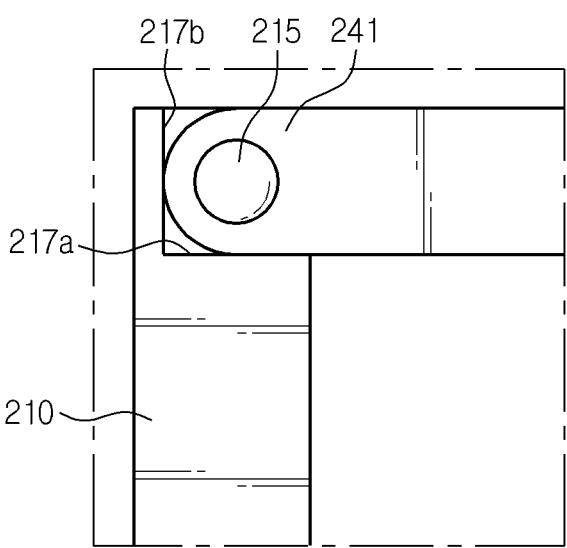
FIGS. 9 and 10 are diagrams for illustrating a rotation angle limit of a front bus bar frame according to an embodiment of the present disclosure.
Figure 10:
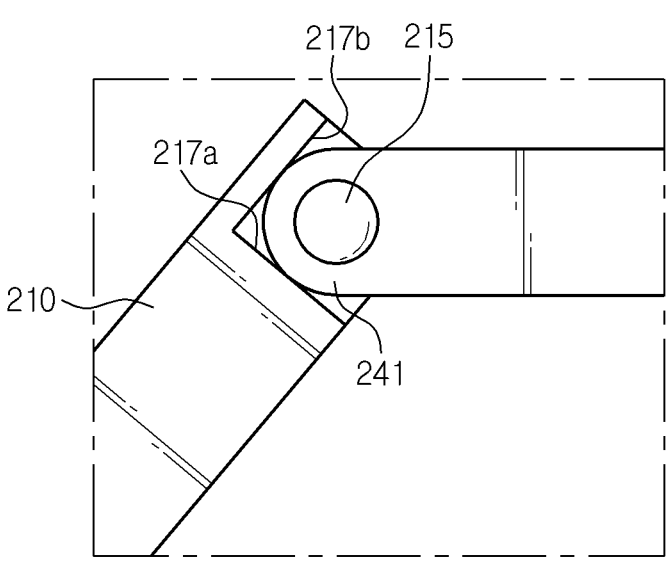

As shown in FIG. 9, when the angle between the front bus bar frame 210 and the bridge plate 240 is 90 degrees, the first stopper surface 217a comes into contact with the lower surface of the end portion 241 of the bridge plate 240 so that the front bus bar frame 210 is not rotatable inwards toward the cell stack 100. In the above state, as shown in FIG. 10, the front bus bar frame 210 is rotatable only in the outward direction.

The second stopper surface 217b is perpendicular to the first stopper surface 217a and thus contacts the top surface of the end portion 241 of the bridge plate 240 when the angle between the front bus bar frame 210 and the bridge plate 240 is 180 degrees. Thus, the front bus bar frame 210 is not able to rotate more than 180 degrees with respect to the bridge plate 240.

Thus, the rotatable range of the front bus bar frame 210 according to this embodiment may be limited within the range of 90 degrees to 180 degrees with respect to the bridge plate 240. This identically applies to the rear bus bar frame 220.

The module case 300 is a structure that forms the appearance of the battery module 1 and may be manufactured in a rectangular tube form by, for example, extrusion or die casting. In the module case 300 (see FIG. 2), the cell stack 100 and the ICB assembly 200 assembled with each other may be inserted and accommodated.

The module case 300 may be manufactured to have a size with which the cell stack 100, in which the ICB assembly 200 is assembled, may be fit into the inner space. Since the cell stack 100 may be compressed in the inner space of the module case 300, it is possible to prevent the battery cells 110 from moving and mitigating the swelling phenomenon. The module cover 400 may be mounted to a front portion and a rear portion of the module case 300. The module cover 400 may be made of an insulating material such as plastic and plays a role of shielding the electrode leads 111 of the battery cells 110 and the bus bars from being exposed to the outside.

Next, another embodiment of the present disclosure will be briefly described with reference to FIG. 11. Like reference signs denote like members, and the same component will not be described again, and features different from the former embodiment will be described in detail.

The battery module 1 according to another embodiment of the present disclosure is different from the former embodiment in terms of the structure for fixing the FPC. For reference, the structures for fixing the FPC to the front bus bar frame 210 and the rear bus bar frame 220 are identical to each other, and thus the fixing structure will be described based on the front bus bar frame 210.

Figure 11:
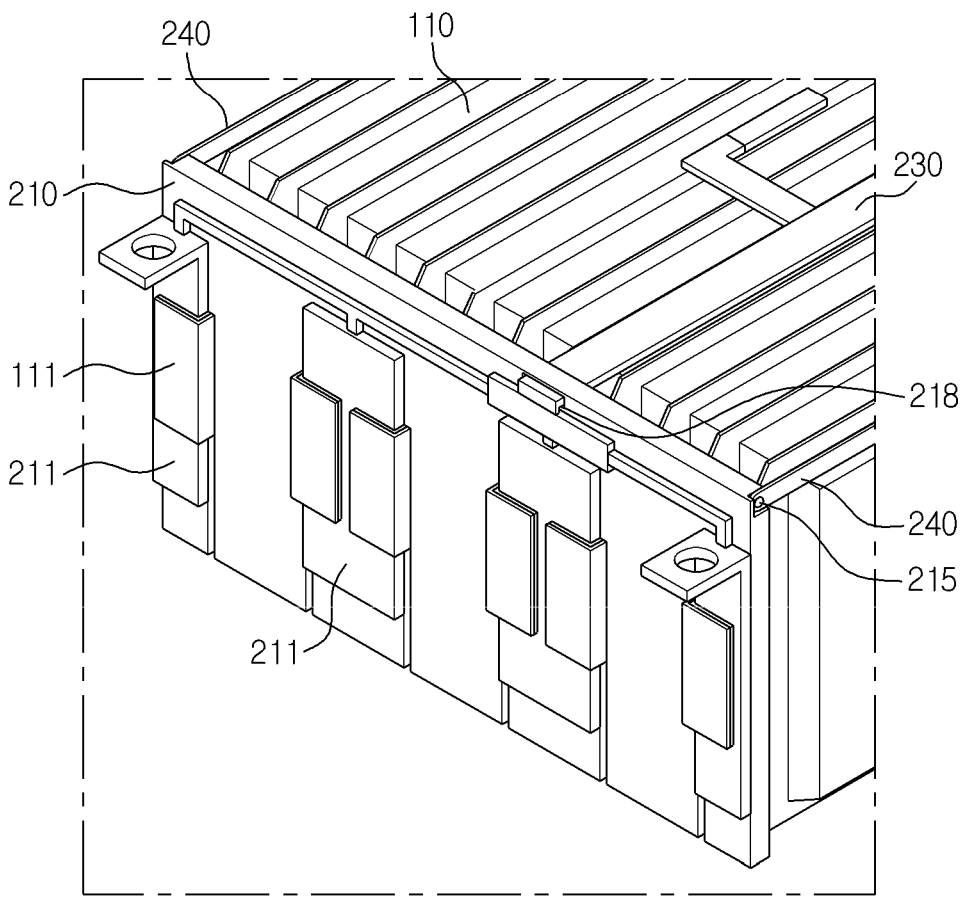
FIG. 11 is a diagram for illustrating an assembled structure of the front bus bar frame and the sensing member according to another embodiment of the present disclosure.

Referring to FIG. 11, the front bus bar frame 210 may further include a slot 218 perforated through a plate surface thereof at a position adjacent to and below the top surface. The FPC may extend forward and backward of the front bus bar frame 210 through the slot 218.

In this embodiment, since the FPC is constrained by the slot 218, the fixed state may be stably maintained even under vibration or shock, compared to the former embodiment. In addition, the position of the FPC may be lowered below the top surfaces of the front bus bar frame 210 and the rear bus bar frame 220, thereby preventing the FPC from being damaged due to friction with the inner wall of the module case 300 when being accommodated in the module case 300.

Meanwhile, a battery pack according to the present disclosure may include at least one battery module 1 according to the present disclosure. In addition, the battery pack according to the present disclosure may further include a pack case for accommodating the battery module 1, various devices for controlling the charge and discharge of the battery module 1 such as a BMS (Battery Management System), a current sensor and a fuse, in addition to the battery module 1.

The battery pack according to the present disclosure may be used as an energy source for an electric vehicle such as an electric vehicle and a hybrid electric vehicle, or a power storage device (ESS).

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, even though the terms expressing directions such as "upper", "lower", "left" and "right" are used in the specification, they are just for convenience of description and can be expressed differently depending on the location of a viewer or a subject, as apparent to those skilled in the art.

What is claimed is:

1. A battery module, which includes a cell stack having a plurality of battery cells stacked along a stacking direction, and an ICB (Inter Connection Board) assembly electrically connected to the plurality of battery cells to sense voltage information, wherein the ICB assembly includes:

a front bus bar frame assembled to a front side of the cell stack and a rear bus bar frame assembled to a rear side of the cell stack, the front bus bar frame and the rear bus bar frame each having a respective plurality of bus bars that are in contact with electrode leads of the battery cells, wherein the front bus bar frame and the rear bus bar frame each have a perimeter defined by a top surface and a bottom surface connected by opposing side surfaces, the opposing side surfaces opposing one another along the stacking direction, and wherein the front bus bar frame and the rear bus bar frame each include slits through which the electrode leads pass in a respective forward and rearward direction, the slits extending downward so as to open through the bottom surface of the respective front and rear bus bar frames;

a sensing member assembled such that one side thereof is connected to the front bus bar frame and the other side thereof is connected to the rear bus bar frame; and a first bridge plate and a second bridge plate each connected to the front bus bar frame and the rear bus bar frame to maintain a gap of a constant distance between the front bus bar frame and the rear bus bar frame, the first and second bridge plates being disposed at a respective one of the opposing side surfaces of the front bus bar frame and a respective one of the opposing side surfaces of the rear bus bar frame, such that an open space is defined between the first and second bridge plates through which the cell stack is exposed, the open space extending from the front bus bar frame to the rear bus bar frame, wherein at least one of the front bus bar frame or the rear bus bar frame has a first bridge assembling portion formed at a top end of one of the respective opposing side surfaces and a second bridge assembling portion formed at a top end of the other one of the respective opposing side surfaces of the corresponding front and/or rear bus bar frame so that an end portion of each of the first and second bridge plates is hinged to a respective one of the first and second bridge assembling portions.

2. The battery module according to claim 1, wherein the first bridge assembling portion has a first hinge shaft and the second bridge assembling portion has a second hinge shaft protruding from opposing surfaces of the respective first and second bridge assembling portions, and wherein the end portion of each of the first and second bridge plates has a perforated hole configured to receive the respective first and second hinge shaft therein.

3. The battery module according to claim 2, wherein each of the first and second hinge shafts are deformed so that a portion thereof extending through the respective perforated hole has an enlarged region positioned on a side of the respective first and second bridge plate that is opposite to the opposing surface of the respective first and second bridge assembling portion from which the respective first and second hinge shaft protrudes, the enlarged region having a greater diameter than the perforated hole.

4. The battery module according to claim 2, wherein at least one of the first and second bridge assembling portions further includes a stopper configured to restrict the at least one of the front bus bar frame or the rear bus bar frame from rotating about the first and second hinge shafts beyond a predetermined angle with respect to the first and second bridge plates.

5. The battery module according to claim 4, wherein the first and second hinge shafts are aligned along a common axis, and wherein the stopper includes a first stopper surface provided at a location radially spaced apart from the common axis of the first and second hinge shafts and arranged so as to contact a lower surface of the end portion of at least one of the first and second bridge plates when an angle between the at least one of the front bus bar frame or the rear bus bar frame and the at least one of the first and second bridge plates becomes 90 degrees.

6. The battery module according to claim 5, wherein the stopper further includes a second stopper surface arranged orthogonal to the first stopper surface so as to contact an upper surface of the end portion of the at least one of the first and second bridge plates when the angle between the at least one of the front bus bar frame or the rear bus bar frame and the at least one of the first and second bridge plates becomes 180 degrees.

7. The battery module according to claim 1,
wherein the sensing member is any one of a FPC (Flexible
  Printed Circuit) and a FFC (Flexible Flat Cable).

8. The battery module according to claim 7,
wherein the FPC or the FFC is disposed to pass through
  a slot defined in each of the front bus bar frame and the
  rear bus bar frame at a respective location adjacent to
  and below the top surface of the front and the rear bus
  bar frames.

9. The battery module according to claim 1, further
comprising:
  a module case having a rectangular tube shape and
    configured to accommodate the cell stack and the ICB
    assembly therein; and
  a module cover configured to shield an open front side and
    an open rear side of the module case.

10. A battery pack, comprising the battery module according to claim 1.

11. A battery module, which includes a cell stack having
a plurality of battery cells stacked along a stacking direction,
and an ICB (Inter Connection Board) assembly electrically
connected to the plurality of battery cells to sense voltage
information,
  wherein the ICB assembly includes:
  a front bus bar frame assembled to a front side of the cell
    stack and a rear bus bar frame assembled to a rear side
    of the cell stack, the front bus bar frame and the rear bus
    bar frame each having a respective plurality of bus bars
    that are in contact with electrode leads of the battery
    cells, wherein the front bus bar frame and the rear bus
    bar frame each have a perimeter defined by a top
    surface and a bottom surface connected by opposing
    side surfaces, the opposing side surfaces opposing one
    another along the stacking direction;
  a sensing member assembled such that one side thereof is
    connected to the front bus bar frame and the other side
    thereof is connected to the rear bus bar frame; and
  a first bridge plate and a second bridge plate each con-
    nected to the front bus bar frame and the rear bus bar
    frame to maintain a gap of a constant distance between
    the front bus bar frame and the rear bus bar frame, the
    first and second bridge plates being disposed at a
    respective one of the opposing side surfaces of the front
    bus bar frame and a respective one of the opposing side
    surfaces of the rear bus bar frame, such that an open
    space is defined between the first and second bridge
    plates through which the cell stack is exposed, the open
    space extending from the front bus bar frame to the rear
    bus bar frame;
  wherein at least one of the front bus bar frame or the rear
    bus bar frame has a first bridge assembling portion
    formed at a top end of one of the respective opposing
    side surfaces and a second bridge assembling portion
    formed at a top end of the other one of the respective
    opposing side surfaces of the corresponding front and/
    or rear bus bar frame so that an end portion of each of
    the first and second bridge plates is hinged to a respec-
    tive one of the first and second bridge assembling
    portions.

12. The battery module according to claim 11,
wherein the first bridge assembling portion has a first
  hinge shaft and the second bridge assembling portion
  has a second hinge shaft protruding from opposing surfaces of the respective first and second bridge
  assembling portions, and wherein the end portion of
  each of the first and second bridge plates has a perfo-
  rated hole configured to receive the respective first and
  second hinge shaft therein.

13. The battery module according to claim 12,
wherein each of the first and second hinge shafts are
  deformed so that a portion thereof extending through
  the respective perforated hole has an enlarged region
  positioned on a side of the respective first and second
  bridge plate that is opposite to the opposing surface of
  the respective first and second bridge assembling por-
  tion from which the respective first and second hinge
  shaft protrudes, the enlarged region having a greater
  diameter than the perforated hole.

14. The battery module according to claim 12,
wherein at least one of the first and second bridge assem-
  bling portions further includes a stopper configured to
  restrict the at least one of the front bus bar frame or the
  rear bus bar frame from rotating about the first and
  second hinge shafts beyond a predetermined angle with
  respect to the first and second bridge plates.

15. The battery module according to claim 14,
wherein the first and second hinge shafts are aligned along
  a common axis, and
wherein the stopper includes a first stopper surface pro-
  vided at a location radially spaced apart from the
  common axis of the first and second hinge shafts and
  arranged so as to contact a lower surface of the end
  portion of at least one of the first and second bridge
  plates when an angle between the at least one of the
  front bus bar frame or the rear bus bar frame and the at
  least one of the first and second bridge plates becomes
  90 degrees.

16. The battery module according to claim 15,
wherein the stopper further includes a second stopper
  surface arranged orthogonal to the first stopper surface
  so as to contact an upper surface of the end portion of
  the at least one of the first and second bridge plates
  when the angle between the at least one of the front bus
  bar frame or the rear bus bar frame and the at least one
  of the first and second bridge plates becomes 180
  degrees.

17. The battery module according to claim 11,
wherein the sensing member is any one of a FPC (Flexible
  Printed Circuit) and a FFC (Flexible Flat Cable).

18. The battery module according to claim 17,
wherein the FPC or the FFC is disposed to pass through
  a slot defined in each of the front bus bar frame and the
  rear bus bar frame at a respective location adjacent to
  and below the top surface of the front and the rear bus
  bar frames.

19. The battery module according to claim 11, further
comprising:
  a module case having a rectangular tube shape and
    configured to accommodate the cell stack and the ICB
    assembly therein; and
  a module cover configured to shield an open front side and
    an open rear side of the module case.

20. A battery pack, comprising the battery module according to claim 11.

* * * * *